US011797611B2

United States Patent
Yu et al.

(10) Patent No.: US 11,797,611 B2
(45) Date of Patent: Oct. 24, 2023

(54) NON-FACTOID QUESTION ANSWERING ACROSS TASKS AND DOMAINS

(71) Applicants:International Business Machines Corporation, Armonk, NY (US); University of Notre Dame, Notre Dame, IN (US)

(72) Inventors: Wenhao Yu, Mishawaka, IN (US); Lingfei Wu, Elmsford, NY (US); Yu Deng, Yorktown Heights, NY (US); Qingkai Zeng, Granger, IN (US); Ruchi Mahindru, Elmsford, NY (US); Sinem Guven Kaya, New York, NY (US); Meng Jiang, Granger, IN (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 17/369,040

(22) Filed: Jul. 7, 2021

(65) Prior Publication Data
US 2023/0012063 A1  Jan. 12, 2023

(51) Int. Cl.
*G06F 16/00* (2019.01)
*G06F 16/9032* (2019.01)
(Continued)

(52) U.S. Cl.
CPC .... *G06F 16/90332* (2019.01); *G06F 18/2431* (2023.01); *G06N 20/00* (2019.01); *G06V 30/418* (2022.01)

(58) Field of Classification Search
CPC ........... G06F 16/90332; G06F 18/2431; G06F 16/24522; G06F 16/3329; G06N 20/00; G06V 30/418
See application file for complete search history.

(56) References Cited

U.S. PATENT DOCUMENTS

| 9,720,981 | B1* | 8/2017 | Boguraev | G06F 16/683 |
| 10,929,392 | B1* | 2/2021 | Cheng | G06N 3/08 |

(Continued)

FOREIGN PATENT DOCUMENTS

| AU | 2020103905 A4 | 2/2021 |
| CN | 110880019 A | 3/2020 |

(Continued)

OTHER PUBLICATIONS

Wu et al., Multi-task learning based on question-answering style reviews for aspect category classification and aspect term extraction on GPU clusters, Jul. 27, 2020, 14 pages (Year: 2020).*

(Continued)

*Primary Examiner* — Noosha Arjomandi
(74) *Attorney, Agent, or Firm* — Nicholas A. Welling

(57) ABSTRACT

An approach for a non-factoid question answering framework across tasks and domains may be provided. The approach may include training a multi-task joint learning model in a general domain. The approach may also include initializing the multi-task joint learning model in a specific target domain. The approach may include tuning the joint learning model in the target domain. The approach may include determining which task of the multiple tasks is more difficult for the multi-task joint learning model to learn. The approach may also include dynamically adjusting the weights of the multi-task joint learning model, allowing the model to concentrate on learning the more difficult learning task.

20 Claims, 8 Drawing Sheets

(51) Int. Cl.
*G06N 20/00* (2019.01)
*G06V 30/418* (2022.01)
*G06F 18/2431* (2023.01)

(56) References Cited

U.S. PATENT DOCUMENTS

| | | | | |
|---|---|---|---|---|
| 2013/0151441 | A1* | 6/2013 | Archambeau | G06N 7/01 706/12 |
| 2013/0325756 | A1* | 12/2013 | He | G06F 18/2431 706/12 |
| 2016/0293034 | A1* | 10/2016 | Agarwalla | G06N 20/00 |
| 2016/0328613 | A1* | 11/2016 | Gaidon | G06V 30/194 |
| 2017/0371861 | A1* | 12/2017 | Barborak | G06F 40/35 |
| 2018/0121799 | A1* | 5/2018 | Hashimoto | G06F 40/205 |
| 2020/0293888 | A1* | 9/2020 | Meyerson | G06N 3/084 |
| 2021/0064821 | A1* | 3/2021 | Seth | G06F 40/295 |
| 2021/0142164 | A1* | 5/2021 | Liu | G06F 40/216 |
| 2021/0286989 | A1* | 9/2021 | Zhong | G06F 40/177 |
| 2021/0311973 | A1* | 10/2021 | Radhakrishnan | G06F 16/3335 |
| 2021/0326742 | A1* | 10/2021 | Rosset | G06F 16/90324 |
| 2021/0406735 | A1* | 12/2021 | Nahamoo | G06F 16/9574 |
| 2022/0258607 | A1* | 8/2022 | Park | G06F 16/3329 |
| 2022/0292269 | A1* | 9/2022 | Niu | G06V 10/803 |
| 2023/0012063 | A1* | 1/2023 | Yu | G06F 16/90332 |

FOREIGN PATENT DOCUMENTS

| | | |
|---|---|---|
| CN | 106803124 B | 4/2020 |
| CN | 108062753 B | 4/2020 |
| CN | 111368058 A | 7/2020 |
| CN | 111966831 A | 11/2020 |
| CN | 112116095 A | 12/2020 |
| CN | 112348199 A | 2/2021 |
| WO | 2019032502 A1 | 2/2019 |

OTHER PUBLICATIONS

Castelli et al., "The TechQA Dataset", arXiv:1911.02984v1 [cs.CL], Nov. 8, 2019, 11 pages.
Chang et al., "Pre-Training Tasks for Embedding-Based Large-Scale Retrieval", Published as a conference paper at ICLR 2020, arXiv:2002.03932v1 [cs.LG], Feb. 10, 2020, 12 pages.
Chen et al., "Open-Domain Question Answering", Proceedings of the 58th Annual Meeting of the Association for Computational Linguistics, Jul. 5, 2020, pp. 34-37, <https://doi.org/10.18653/v1/P17>.
Chen et al., "Reading Wikipedia to Answer Open-Domain Questions", arXiv:1704.00051v2 [cs.CL], Apr. 28, 2017, 10 pages.
Deng et al., "Knowledge as A Bridge: Improving Cross-domain Answer Selection with External Knowledge", Proceedings of the 27th International Conference on Computational Linguistics, Santa Fe, New Mexico, USA, Aug. 20-26, 2018, pp. 3295-3305.
Devlin et al., "BERT: Pre-training of Deep Bidirectional Transformers for Language Understanding", arXiv:1810.04805v2 [cs.CL] May 24, 2019, 16 pages.
Gardner et al., "On Making Reading Comprehension More Comprehensive", Proceedings of the Second Workshop on Machine Reading for Question Answering, Hong Kong, China, Nov. 4, 2019, pp. 105-112.
Gururangan et al., "Don't Stop Pretrainng: Adapt Language Models to Domains and Tasks", arXiv:2004.10964v3 [cs.CL], May 5, 2020, 19 pages.

Guu et al., "REALM: Retrieval-Augmented Language Model Pre-Training", arXiv:2002.08909v1 [cs.CL] Feb. 10, 2020, 12 pages.
Jiang et al., "Social Recommendation with Cross-Domain Transferable Knowledge", IEEE Transactions on Knowledge and Data Engineering, vol. 27, No. 11, Nov. 2015, pp. 3084-3097.
Karpukhin et al., "Dense Passage Retrieval for Open-Domain Question Answering", arXiv:2004.04906v3 [cs.CL], Sep. 30, 2020, 13 pages.
Lan et al., "ALBERT: A Lite BERT for Self-Supervised Learning of Language Representations", Published as a conference paper at ICLR 2020, arXiv:1909.11942v6 [cs.CL], Feb. 9, 2020, 17 pages.
Lee et al., "Latent Retrieval for Weakly Supervised Open Domain Question Answering", arXiv:1906.00300v3 [cs.CL], Jun. 27, 2019, 11 pages.
Mell et al., "The NIST Definition of Cloud Computing", Recommendations of the National Institute of Standards and Technology, Special Publication 800-145, Sep. 2011, 7 pages.
Min et al., "Question Answering through Transfer Learning from Large Fine-grained Supervision Data", arXiv:1702.02171v6 [cs.CL], Jun. 21, 2018, 8 pages.
Pan et al., "A Survey on Transfer Learning", IEEE Transactions on Knowledge and Data Engineering, vol. 22, No. 10, Oct. 2010, pp. 1345-1359.
Qu et al., "Open-Retrieval Conversational Question Answering", SIGIR '20, Jul. 25-30, 2020, Virtual Event, China, pp. 539-548, https://doi.org/10.1145/3397271.3401110.
Rajpurkar et al., "Know What You Don't Know: Unanswerable Questions for SQuAD", arXiv:1806.03822v1 [cs.CL], Jun. 11, 2018, 9 pages.
Rajpurkar et al., "SQUAD: 100,000+ Questions for Machine Comprehension of Text", arXiv:1606.05250v3 [cs.CL], Oct. 11, 2016, 10 pages.
Ruder et al., "Transfer Learning in Natural Language Processing Tutorial", Proceedings of NAACL HLT 2019: Tutorial Abstracts, Minneapolis, Minnesota, Jun. 2, 2019, pp. 15-18.
Wang et al., "Multi-passage BERT: A Globally Normalized BERT Model for Open-domain Question Answering", arXiv:1908.08167v2 [cs.CL] Oct. 2, 2019, 5 pages.
Wu et al., "Word Mover's Embedding: From Word2Vec to Document Embedding", arXiv:1811.01713v1 [cs.CL], Oct. 30, 2018, 15 pages.
Xiong et al., "Pretrained Encyclopedia: Weakly Supervised Knowledge-Pretrained Language Model", Published as a conference paper at ICLR 2020, arXiv:1912.09637v1 [cs.CL] Dec. 20, 2019, 13 pages.
Yang et al., "End-to-End Open-Domain Question Answering with BERTserini", arXiv:1902.01718v2 [cs.CL], Sep. 18, 2019, 6 pages.
Yang et al., "XLNet: Generalized Autoregressive Pretraining for Language Understanding", 33rd Conference on Neural Information Processing Systems (NeurIPS 2019), Vancouver, Canada, arXiv:1906.08237v2 [cs.CL], Jan. 2, 2020, 18 pages.
Yao et al., "Graph Few-shot Learning via Knowledge Transfer", arXiv:1910.03053v3 [cs.LG], May 11, 2020, 10 pages.
Yu et al., "A Technical Question Answering System with Transfer Learning", Proceedings of the 2020 EMNLP (Systems Demonstrations), Nov. 16-20, 2020, pp. 92-99.
Yu et al., "Crossing Variational Autoencoders for Answer Retrieval", arXiv:2005.02557v2 [cs.CL], Jul. 6, 2020, 7 pages.
Yu et al., "Technical Question Answering across Tasks and Domains", 2021 Annual Conference of the North American Chapter of the Association for Computer Linguistics, Submitted on Oct. 19, 2020 (v1), last revised May 18, 2021 (this version, v2), arXiv:2010.09780v2 [cs.CL] May 18, 2021, 9 pages, Grace Period Disclosure Document.

* cited by examiner

NON-FACTOID QUESTION ANSWERING ACROSS TASKS AND DOMAINS

STATEMENT REGARDING FEDERALLY SPONSORED RESEARCH OR DEVELOPMENT

This invention was made with government support under IIS1849816 awarded by the National Science Foundation. The government has certain rights in the invention.

STATEMENT REGARDING PRIOR DISCLOSURES BY THE INVENTOR OR JOINT INVENTOR

The following disclosure(s) are submitted under 35 U.S.C. 102(b)(1)(A) as prior disclosures by, or on behalf of, a sole inventor of the present application or a joint inventor of the present application.

Wenhao Yu[†], Lingfei Wu[‡], Yu Deng[‡], Qingkai Zeng[†], Ruchi Mahindru[†], Sinem Guven[‡], Meng Jiang[†], ([†]University of Notre Dame, Notre Dame, IN, USA, [‡]IBM Thomas J. Watson Research Center, Yorktown Heights, NY, USA), "Technical Question Answering across Tasks and Domains" for consideration to the 2021 Annual Conference of the North American Chapter of the Association for Computer Linguistics, Submitted on 19 Oct. 2020 (v1), last revised 18 May 2021 (v2), arXiv:2010.09780v2 [cs.CL] 18 May 2021.

BACKGROUND OF THE INVENTION

The present invention relates generally to natural language processing, more specifically to transfer learning question answering frameworks.

Natural language processing has changed the landscape of user interactions with computing devices. Word encoding models have allowed for words to be represented by vector representations. Transformers in particular allow for simultaneous generation of word representations for multiple sentences and quick training of models. Bidirectional encoding representation by transformers ("BERT") models have allowed for extremely accurate semantic context in general and specific domains.

Automated support systems have seen numerous advances in recent years. In many cases, chatbots may possess a general domain question and answering framework allow for users to ask questions and receive an answer to a relevant question, based on retrieval of a semantically relevant document. Domain specific question answering frameworks are typically trained though joint learning. Joint learning is fine tuning a pretrained encoding model and an untrained decoding model to accomplish a task by providing training samples in the desired domain. This has provided a fast efficient method for training a question answering framework within a specific domain.

SUMMARY

The present disclosure includes an embodiment of a computer-implemented method for training a machine learning framework for answering non-factoid questions across tasks and domains. The computer-implemented method comprises training a multi-task joint learning model in a general domain. Also, the computer-implemented method further comprise initializing the multi-task joint learning model in a specific target domain. Additionally, the computer-implemented method further comprises tuning the multi-task joint learning model in the target domain.

Additionally, the present disclosure includes an embodiment of a computer system for system for training a machine learning framework for answering non-factoid questions across tasks and domains. The computer system comprises a processor, a readable storage media, and computer program instructions. The computer program instructions comprise instructions to train a multi-task joint learning model in a general domain. The instructions also include initialize the multi-task joint learning model in a specific target domain. Further, the instructions include tune the multi-task joint learning model in the target domain.

The present disclosure also include an embodiment of a computer program product for training a machine learning framework for answering non-factoid questions across tasks and domains. The computer program product includes one or more computer readable storage media and program instructions stored on the one or more computer readable storage media. The computer program instructions comprise instructions to train a multi-task joint learning model in a general domain. The computer program product also includes instructions to initialize the multi-task joint learning model in a specific target domain. Further, the computer program product includes instructions to tune the multi-task joint learning model in the target domain.

Further, the present disclosure includes a computer-implemented method for training a machine learning framework for answering non-factoid question across tasks and domains. The computer-implemented method may include encoding a domain specific data set of a plurality of question/candidate document pairs, based on a general purpose machine learning framework. Further, the computer implemented method may include generating, in parallel, a reading score and a matching score for each of the question-document pairs based on the encoding. Additionally, the computer implemented method may include calculating a task concentration weight, based on an expected reading score for the domain specific data set and the generated reading score. Also, the computer implemented method may include generating a weight adjusted joint learning loss, based, at least in part, on the task concentration weight, the reading score, and the matching score. Finally, the computer implemented method may include updating the weights of the general purpose machine learning framework, based on the calculated weight adjusted joint learning loss.

The present disclosure may also include an additional computer-implemented method for a computer-implemented method for non-factoid question answering. The computer implemented method comprising encoding each of a plurality of question/candidate document pairs. The computer implemented method may also include identifying a plurality of answer snippets within each document from the plurality of question candidate document pairs. Further, the computer implemented method may include generating, in parallel, a reading score for each of the plurality of question/candidate document pairs and a matching score for each of the plurality of question candidate document pairs, based on each encoded question/candidate document pair. Also included in the computer implemented method, generating a joint prediction score for each encoded question/candidate document pair, based on the matching score and the reading score. Further, the computer implemented method may include determining an answer snippet form the question/candidate document pair with the highest joint score.

The above summary is not intended to describe each illustrated embodiment of every implementation of the present disclosure.

Figure 1:
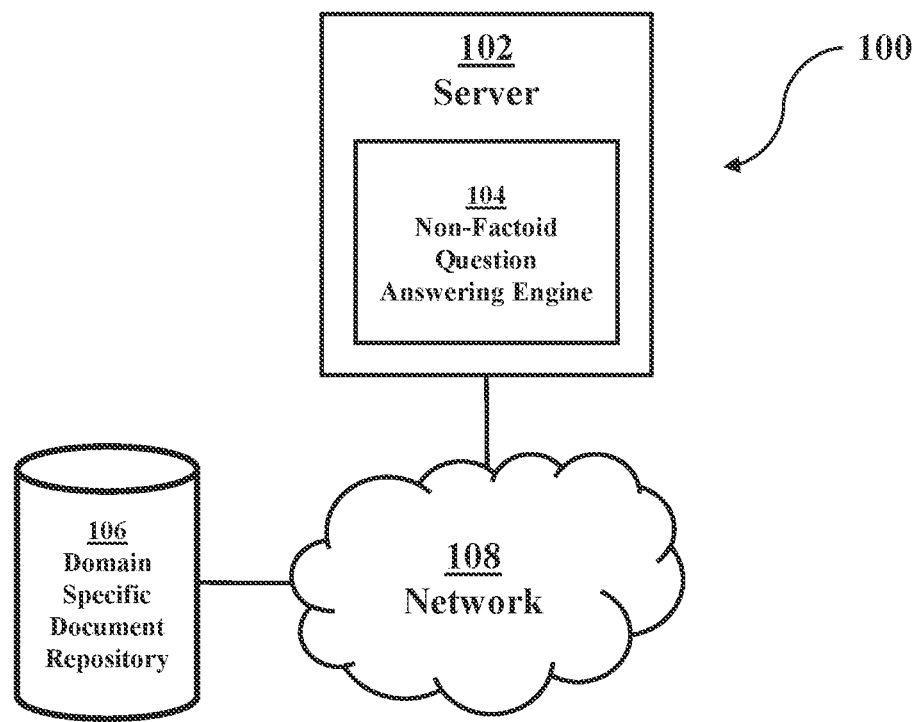
FIG. 1 is a functional block diagram generally depicting a non-factoid question answering across tasks and domains environment 100, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted and described herein recognize the benefits of a non-factoid question answering framework based on jointly training the framework across tasks and domains.

While many strides have been made in natural language question and answer frameworks, state of the art frameworks have difficulty answering non-factoid questions. A non-factoid question is a question that that requires an answer with actionable solutions and/or requires missing information to be filled in. Non-factoid questions differ from factoid based questions in that there is some type of explanation associated with the answer. Factoid based questions are generally closely semantically related to an answer. Current non-factoid question answering models have a two-step process of document retrieval and answer snippet identification. The two-step process can allow for documents with potential answers to be missed, thus resulting in lower accuracy for questions within a non-factoid question answering framework. Non-factoid questions generally do not have factoid related answers, and thus answering the questions many times requires actionable solutions and/or missing information must be filled in, many times resulting in sentence or paragraph structured answer. In factoid based questions, the semantically related answer is identified and aligned within a span of text from a document. The lack of semantic relationship has been difficult to overcome. Additionally, many domains do not have a large dataset with which to train a framework, thus causing more difficulty in associating semantically relevant data with documents.

In designing a non-factoid domain specific question answering framework, there are two considerations. First, there is transfer learning to the specific domain by the framework. Second, there are two tasks that must be accounted for during training—reading comprehension and document retrieval. Embodiments of the invention perform both tasks in parallel, removing the potential of missing answers due to poor document retrieval and identifying highly relevant potential answer snippets within each document. Further, answer snippets are considered within every document and scored, while each document is considered and scored based on whether it is a semantic match. The two scores are linearly combined, and each question and candidate document pair is ranked or scored.

In an embodiment of the present invention, a training set of question/candidate documents can be encoded by a pre-trained word encoding model within a non-factoid question answering framework. The encodings can be decoded by classification models. For example, an embodiment can have two multilayer perceptron classification models. From the classification models, a reading score and a matching score can be generated simultaneously. The reading score can be generated based on a reading comprehension model and the matching score can be generated by a document retrieval model. A weighted joint learning loss between the two models can be calculated. The weighted task joint learning loss can allow for optimization of the model based on the more difficult task between reading comprehension and document matching. The weight for the joint learning loss can be determined by taking the difference of the expected reading score for the sample and the generated reading score. The weight can be dynamically calculated for each sample and averaged, resulting in the weight for the weighted joint loss.

In an embodiment of the invention, a non-factoid question in a specific domain may be received by a non-factoid question answering framework. Candidate documents may be retrieved from a document repository. The question/candidate document pairs may be generated. Each of the question/candidate document pairs can be tokenized and fed into an encoding model. The encoding model can generate a vector representation for each token in the question/candidate document pairs. The vector representations can be combined into a matrix representation. The reading comprehension model can read each of the vector representations within the matrix representation and assign a snippet start score and a snippet end score for token. A reading score for the question/candidate document pair can be generated based on the assigned snippet start and snippet end scores. The document matching model can assign a matching score for the entire document based on the matrix representation. The matching score and the reading score can be linearly combined to assign a score for each of the question/candidate document pairs.

Embodiments of the present invention improve upon deficiencies of current non-factoid question answering approaches by providing a method, computer program product, and computer system with better non-factoid answer questioning abilities. For example, once a question is received, the question is analyzed in conjunction with every document within a domain specific document repository as a question/candidate document pair. The analysis provides a global perspective of the entire document, thereby allowing for a determination of whether the question and document are aligned and a local perspective of the sentences and words within the document to determine if there is an answer snippet with document to answer the question. Further, the approach allows for fast, efficient training of a non-factoid question answering framework in a specific domain. Training the framework also improves upon deficiencies of current technology by the parallel optimization of document retrieval and reading comprehension tasks, while concentrating on optimization of the more difficult task between the two.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure, or characteristic in connection with an embodiment, one skilled in the art has the knowledge to affect such feature, structure, or characteristic in connection with other embodiments whether or not explicitly described.

Referring now to the figures, FIG. 1 is a functional block diagram depicting, generally, a non-factoid question answering environment 100. Non-factoid question answering environment 100 comprises non-factoid question answering engine 104 operational on server 102, and domain specific document repository 106 interconnected over network 108. As shown in FIG. 1, non-factoid question answering engine 104 can access domain specific document repository 106 via network 108. In an alternative embodiment, domain specific document repository 106 is remotely located from server 102.

Server 102 can be a standalone computing device, a management server, a web server, a mobile computing device, or any other electronic device or computing system capable of receiving, sending, and processing data. In other embodiments, server 102 can represent a server computing system utilizing multiple computers as a server system such as in cloud computing environment 50 (depicted in FIG. 7). In an embodiment, server 102 can represent a computing system utilizing clustered computers and components (e.g., database server computers, application server computers, etc.) that act as a single pool of seamless resources when accessed within non-factoid question answering across tasks and domains environment 100. In another embodiment, server 102 can be a laptop computer, a tablet computer, a netbook computer, a personal computer, a desktop computer, or any programmable electronic device or combination of programmable electronic devices capable of executing machine readable program instructions and communicating with each other, as well as domain specific document repository 106, and other computing devices (not depicted) within non-factoid question answering across tasks and domains environment 100 via network 108. It should be noted, while only a single server 102 is shown in FIG. 1, in other embodiments, multiple servers or other computing devices can be present within non-factoid question answering across tasks and domains environment 100.

Figure 6:
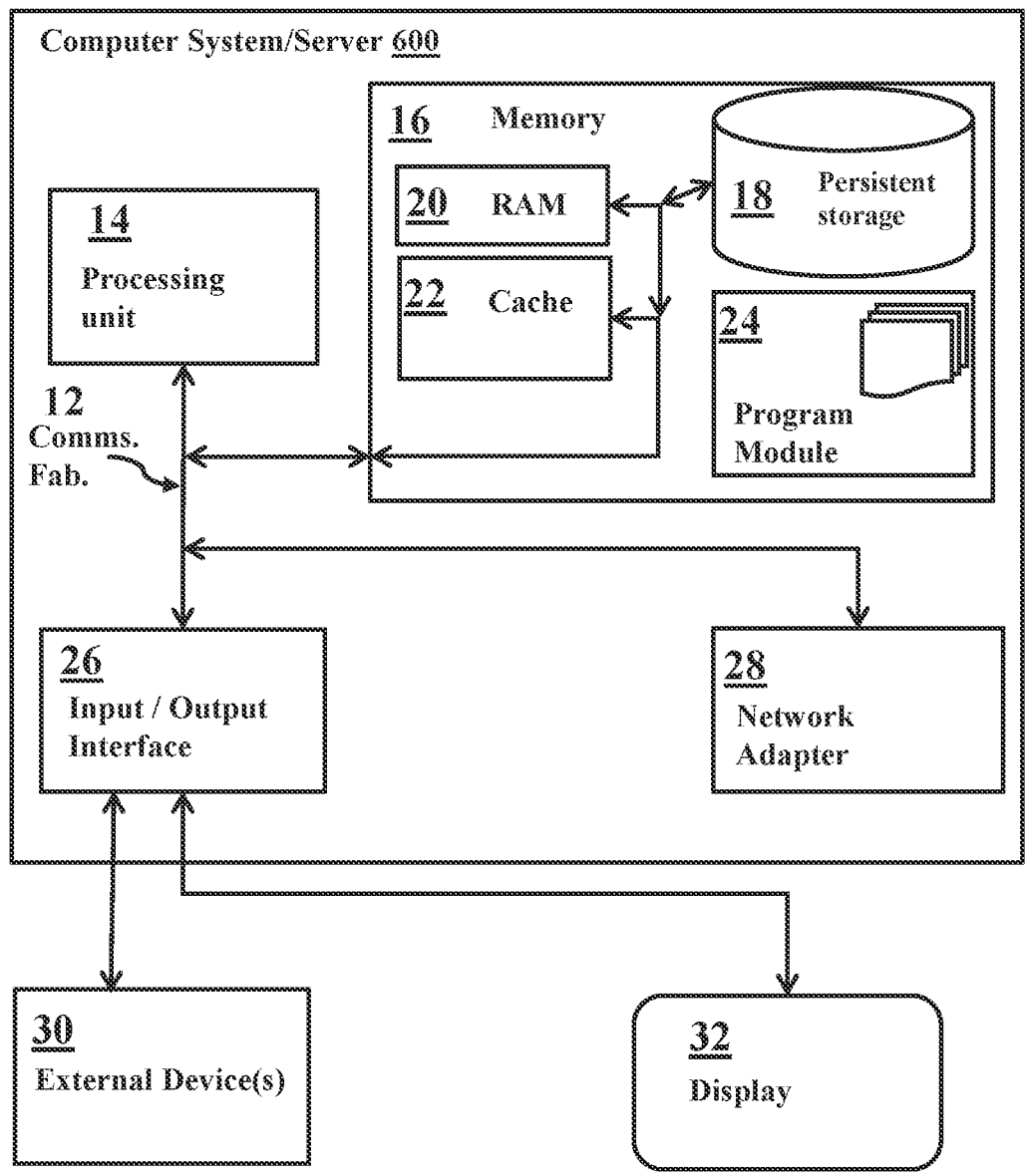
FIG. 6 is a functional block diagram of an exemplary computing system 600 in a non-factoid question answering across tasks and domains environment, in accordance with an embodiment of the present invention.

Server 102 may include components as depicted and described in further detail with respect to computer system 600 in FIG. 6. Server 102 may include components as depicted and described in further detail with respect to cloud computing node 10 of cloud computing environment 50 in FIG. 7.

Non-factoid question answering engine 104 is a computer program that can be configured to receive questions and identify answer snippets for the questions, and provide the answers through a user interface. Non-factoid question answering engine 104 can train and update a non-factoid question answering to answer non-factoid questions within a specific domain. In an embodiment, non-factoid question framework can have an initialized pretrained encoding model trained on a general domain and randomized task based decoding model. Training samples within the specific domain can be fed into the framework and the framework can be iteratively optimized for the specific domain and tasks. Non-factoid question answering engine 104 can be configured to have an output ability which allows for the identification of an answer snippet from a document in response to a user's query.

Domain specific document repository 106 is a database of domain specific documents. Documents can include technical documents, topic report, research articles, blog posts, encyclopedia articles, etc. In an embodiment, domain specific document repository 106 can be continuously updated via the internet. For example, domain specific document repository 106 can contain entries on a forum for technical information relating to technology or science (e.g., information technology, programming, automotive, life science, chemistry, physics, etc.) As more questions are posted on the forum, the information can be used to update domain specific document repository 106. Further, domain specific document repository 106 may include blog posts and video (e.g. closed captioning or transcripts) posts relating to the specific domain.

Network 108 can be a telecommunications network, a local area network (LAN), a wide area network (WAN), such as the Internet, or a combination of the three, and can include wired, wireless, or fiber optic connections. Network 108 may include one or more wired and/or wireless networks that are capable of receiving and transmitting data, voice, and/or video signals, including multimedia signals that include voice, data, and video information. In general, network 108 can be any combination of connections and protocols that will support communications between server 102, domain specific document repository 106, and external computing devices (not shown) within non-factoid question answering across tasks and domains environment 100.

Network 108 can be, for example, a local area network (LAN), a wide area network (WAN) such as the Internet, or a combination of the two, and can include wired, wireless, or fiber optic connections. In general, network 108 can be any combination of connections and protocols that will support communications between servers 102 and other computing devices (not shown).

Figure 2:
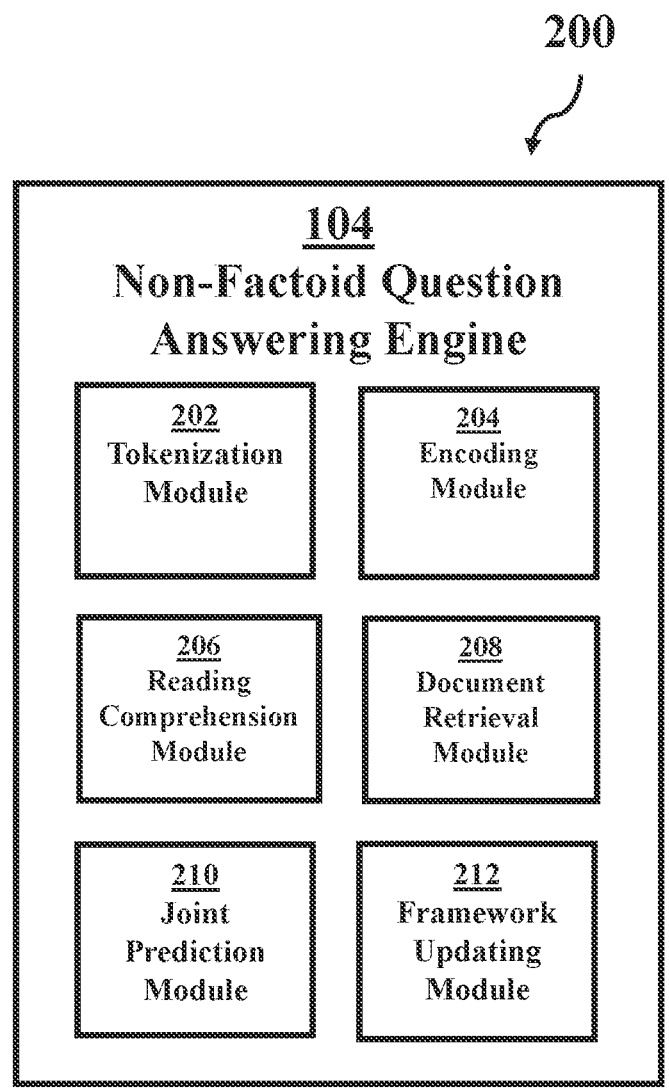
FIG. 2 is a functional block diagram 200 depicting non-factoid question answering engine, in accordance with an embodiment of the present invention.

FIG. 2 is a functional block diagram 200 of non-factoid question answering engine 104. Tokenizer module 202, encoding module 204, reading comprehension module 206, document retrieval module 208, joint prediction module 210, and framework updating module 212 are shown operational within non-factoid question answering engine 104.

In some embodiments, tokenizer module 202 may be a computer module that performs lexical analysis. Tokenizer module 202 may convert a sequence of characters into a sequence of tokens. A token may be a string of characters included in a recording and categorized as a meaningful symbol. Further, in some embodiments, tokenizer module 202 may identify word boundaries in a query and break any text within the query into component text elements, such as words, multiword tokens, numbers, and punctuation marks. In some embodiments, the tokenizer module 202 may receive a string of characters, identify the lexemes in the string, and categorize them into tokens.

Encoding module 204 is a computer module that can be configured to generate encoding representations for questions and documents. In an embodiment, encoding module 204 can receive tokens corresponding to objects within a question/candidate document pair and generate a vector representation for each token within the question/candidate document pair. For example, encoding module 204 can be a language model (e.g. BERT) that receives tokens from tokenizer module 202 The tokens can represent an object of the document. Objects within a document may have more than one token. For example, a word within a question may have a token corresponding to the word itself, a token for the position of the word within the question, and a token representing that it is within the question (words within the candidate document can have a token representing that it is within the candidate document). Tokens may relate to other things within the question/candidate document pair (e.g. question title tokens, separation tokens, classification tokens, etc.).

In an embodiment, encoding module 204 can provide a vector representation for each token of the question/candidate answer pair. The vector representation can be combined into a matrix representation for use by decoders. The encoder may be a pretrained model initialized with parameters in a general domain, for example the encoder may be a pretrained general purpose BERT model. The general purpose BERT model may be pretrained on a general domain question answer set, such as the Stanford question and answer dataset ("SQuAD").

In an embodiment, encoding module 204 can be fine-tuned to a specific domain through transfer learning. For example, using a domain specific training dataset, the output encodings can be processed by one or more decoding models to generate an output. The decoding model can be optimized using the difference between the expected result and the generated output. Further, the weights of the encoding model can be fine-tuned based on the differences between the expected result and the generated result for the specific domain.

Reading comprehension module 206 is a computer module that can be configured to identify answer snippets. In an embodiment, reading comprehension module 206 can be based on a feed forward neural network (e.g., a perceptron neural network). In an embodiment, reading comprehension module 206 can read the output encodings of encoding module 204 and generate a snippet start score and a snippet end score for each token within the candidate document. For example, the snippet start score, and the snippet end score can be calculated in the following manner from a matrix representation of a question/candidate document pair:

$$P_{start} = w_{start} \times H^T,$$

$$P_{end} = w_{end} \times H^T$$

where $P_{start}$ is the snippet start score for the token, $w_{start}$ is the weight assigned to calculate the snippet starting token, and $H^T$ is the vector representation of the token; $P_{end}$ is the snippet start score for the token, $w_{end}$ is the weight assigned to calculate the snippet end score, and $H^T$ is the vector representation of the token.

In another embodiment, a reading comprehension score can be calculated to identify the most likely answer within a document from the combined answer snippet score. The reading comprehension score snippet can be calculated as follows:

$$S_{RC} = (\hat{D}_{start}, \hat{D}_{end})$$

$$D_{start} = \operatorname{argmax}_{k \in \{1,\ldots,m\}} P_{start}[k]$$

$$D_{end} = \operatorname{argmax}_{k \in \{1,\ldots,m\}} P_{end}[k]$$

where $S_{RC}$ is the reading comprehension score for the snippet, $\hat{D}_{start}$ is the mean of the starting snippet scores, $\hat{D}_{end}$ is the mean of the ending snippet scores, and k is the index of the token.

Document retrieval module 208 is a computer module that can be configured to generate a matching score for the question/candidate document pair. In an embodiment, document retrieval module 208 can be a feed forward neural network that reads the output encodings of the question/candidate document pairs generated by encoding module 204 and generates a matching score based on the encodings. A matching score predicts whether the question and the document are aligned (i.e., semantically related). A matching score can be generated in the following manner:

$$p_{DR} = \sigma(w_{DR} \times h)$$

where $p_{DR}$ is the matching score, which is a probability the question/candidate document are aligned, σ is a trainable sigmoid function, $w_{DR}$ is a weight assigned to the matching score, and h is a variable that can be calculated from the encodings of the question/candidate document pair (described further below).

In an embodiment, h can be calculated by mean-pooling the representations of all tokens. For example, if the encoder is a BERT model, h can be calculated as follows:

$$h = \operatorname{MEAN}(\{\operatorname{BERT}_\theta(q)[X] | X \rightarrow q\})$$

where $\operatorname{BERT}_\theta$ is a BERT model with initial pretrained parameters from a general domain, q is the input sequence of the question/candidate document pair, and X is a vector representation of each token from input sequence q.

In another embodiment, h can be calculated from a classification token for the input sequence q in the following manner:

$$h = \operatorname{BERT}_\theta(q)[CLS]$$

where CLS is the encoding value of the classification token.

Joint prediction module 210 is a computer module that can be configured to generate a ranking score for the question/candidate document pair. A ranking score can be a linear combination of the reading comprehension score and the document retrieval score (described further below). In an embodiment, the ranking score can be a prediction for the probability that an identified answer snippet correctly addressed the proposed question. In another embodiment, joint prediction module 210 assigns ranking scores to every question/candidate pair to provide the identified answer snippet from the highest ranked question/candidate document pair.

In an embodiment, joint prediction module 210 can generate a reading score based on the reading comprehension score and the probability a document will contain the answer snippet. The reading score can be generated in the following manner:

$$S_{read} = (p_{start}[D_{start}] + p_{end}[D_{end}]) - (p_{start}[0] + p_{end}[0])$$

where $p_{start}[0]$ denotes the probability of taking the first token of the sequence as the start position and denotes the probability of taking the first token of the sequence as the $p_{end}[0]$ end position of the sequence.

In an embodiment, the reading score can be used to calculate a joint ranking score of a question/candidate document pair as follows:

$$\operatorname{Rank}_{Joint} = \alpha \cdot p_{DR} + (1-\alpha) \cdot S_{read}$$

Framework updating module 212 is a computer module that can dynamically optimize and continually update the modules withing non-factoid question answering engine 104. In an embodiment, framework updating module 214 can calculate a weight-adjusted joint learning loss function that allows the transfer learning optimization process to concentrate on the more difficult task between reading comprehension and document retrieval. A weight adjustable joint learning function can be calculated in the following manner:

$$\mathcal{L}^{(aux)} = w \cdot \mathcal{L}_{RC}(\Theta^{(aux)}, \theta_{RC}^{(aux)}) + \lambda^{(aux)} \cdot \mathcal{L}_{DR}(\Theta^{(aux)}, \theta_{RC}^{(aux)})$$

where "w" is the task concentration weight for the training model (described further below), "$L_{RC}$" is the loss for the reading comprehension model, "$\Theta^{(aux)}$" is the initial parameters of the encoding model, "$\lambda^{(aux)}$" is the hyperparameter for the weight of the document retrieval task over reading comprehension task, "$L_{DR}$" is the loss for the document retrieval model, and "$\theta_{DR}^{(aux)}$" is the initial parameters of the document retrieval model. The weight of the task concentration weight can be calculated as follows:

$$w = \exp\left(\frac{|(D_{end} - D_{start}) - (\hat{D}_{end} - \hat{D}_{start})|}{D_{end} - D_{start}}\right)$$

For example, if a training data set is applied to non-factoid question answering engine 104, framework updating module 214 can determine the difference between the expected reading comprehension score and the generated reading comprehension score for each sample in the set. If the difference between the two is greater than a threshold, framework updating module 214 will apply a weight to the joint loss function in favor of optimizing for reading comprehension. If the difference between the expected and generated reading comprehension score is below a threshold, framework updating module 214 will apply a weight to the joint learning loss function to concentrate on document retrieval.

Figure 3:
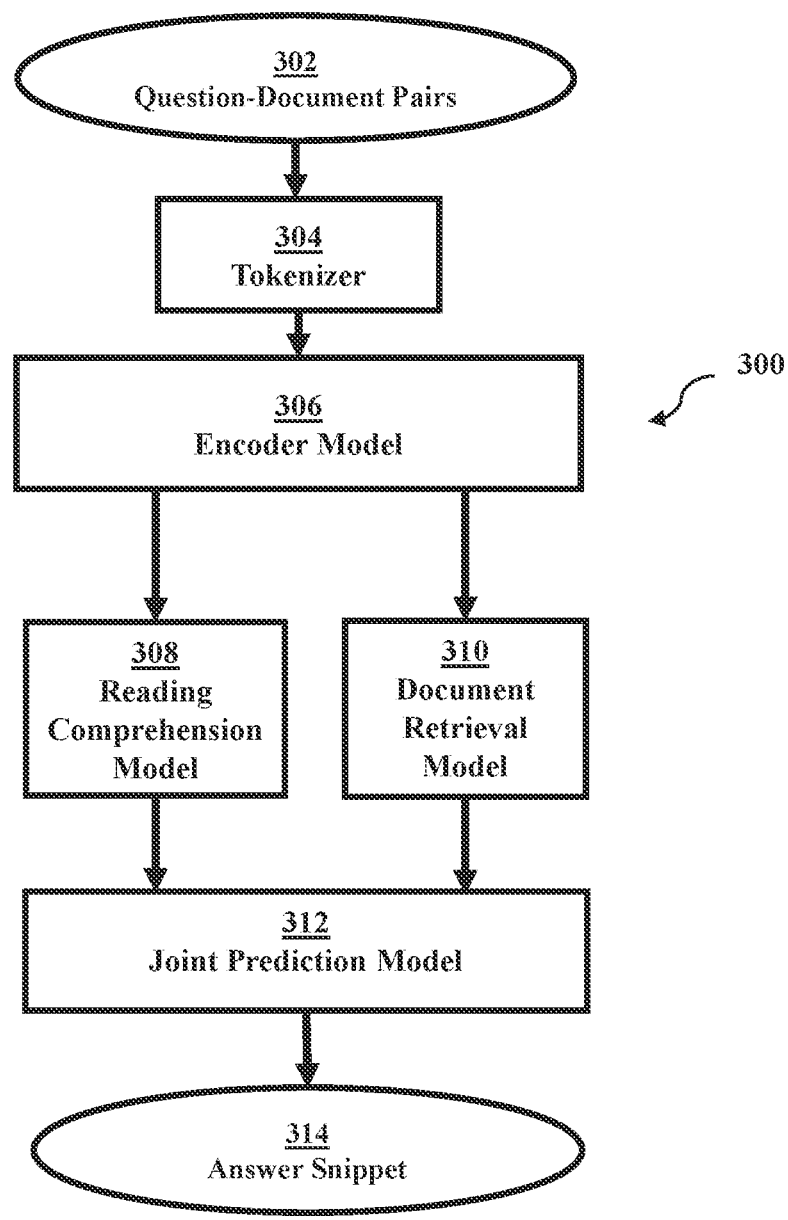
FIG. 3 is a block diagram of a high level architecture for a non-factoid question answering framework 300, in accordance with an embodiment of the present invention.

FIG. 3 is a block diagram depicting a high level architecture of a joint task learning question answering framework 300, in accordance with an embodiment of the invention. Question-document candidate pair 302 can be a query from a user and a document retrieved from a domain specific document repository 106. Question-document candidate pair 302 is fed into tokenizer 304. Tokenizer 304 can generate tokens for each object in the question/candidate document pair. The generated tokens can be fed into encoder model 306. Encoder model 306 can generate a vector representation for each token. Encoder model 306 can be a BERT based model trained on a general domain question/answer data set. The vector representations can be organized into a matrix representation with each vector assigned an index. The encodings can be fed into reading comprehension model 308 and document retrieval model 310. The encodings can be processed by in parallel by reading comprehension model 308 and document retrieval model 310. Reading comprehension model 308 can generate a reading score. Reading comprehension model 308 can identify a candidate answer snippet based on individual snippet start and snippet end scores for each token in the candidate document. The reading score can be an averaged localized score corresponding to the semantic relationship between the question and the each word of the document, by generating one or more scores for each token in the document. Reading comprehension model 308 may have a softmax layer to normalize the outputs for future processing. The document retrieval model 310 can generate a document matching score corresponding to the semantic relationship globally for the question and document as a whole. Document retrieval model 310 may have a softmax layer for normalization of the output for future processing Joint prediction model 312 may receive the output of reading comprehension model 308 (e.g., the reading score) and document retrieval model 310 (e.g., the document matching score) and generate a ranking score for the question candidate document pair. In an embodiment, joint prediction model 312 may also factor the probability of the candidate document containing the answer to the question in the ranking score. The ranking score can be a score allowing the identified answer snippet 314 to be presented to the if the score is above a threshold. In another embodiment, if multiple question/candidate document pairs are analyzed by the learning framework, the identified answer snippet 314 from the question/candidate document pair with the highest ranking score can be presented to the user.

Figure 4:
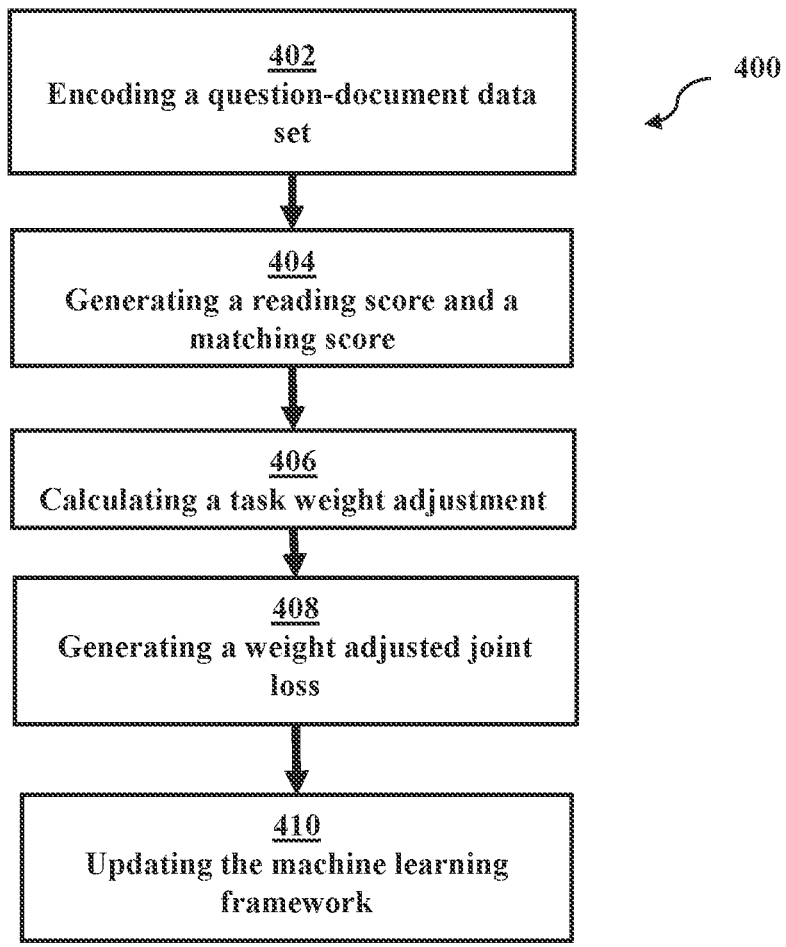
FIG. 4 is flowchart 400 for training a non-factoid question answering framework, in accordance with an embodiment of the present invention.

FIG. 4 is a flowchart diagram, depicting operational steps for training a non-factoid question answering framework, generally designated 400. At step 402, a training dataset of domain specific question/candidate document pairs is encoded. In an embodiment, the dataset may be from a technical domain (e.g., information technology, automotive repair, computer hardware troubleshooting, etc.). For example, encoding module 204 can encode the question/candidate document pair. The encoding may be based on a BERT model that has been pretrained on a general domain.

At step 404, a reading score and a matching score are generated in parallel, based on a reading comprehension model and a document retrieval model. The encodings generated for the question/candidate pairs can be processed by two models. For example, reading comprehension module 206 can generate a reading score, while document retrieval module 208 can generate a matching score. In an embodiment, a reading score can be generated for the question/candidate document pair, based on snippet start scores and snippet end scores associated with each word in the question/candidate document pairs.

In an embodiment, a matching score can be generated by the document retrieval model. The matching score can be the alignment of the question/candidate document, based on the encoding of the two from a global perspective. In an embodiment, the matching score is based on the mean pooling of all encoding representations of the question/candidate document.

At step 406, a task weight adjustment is calculated. In an embodiment, the difference between the generated reading score and the expected reading score can be calculated. For example, framework updating module can calculate a task weight adjustment. Based on the magnitude of the difference, a task weight adjustment can be calculated allowing for a loss function to be calculated allowing for the optimization of the model to concentrate on the more difficult task.

At step 408, a weight adjusted joint learning loss for the framework is generated. In an embodiment, the task weight adjustment is included in the weight adjusted joint learning loss. For example, framework updating module can calculate a task weight adjustment. The weight adjusted joint learning loss can be a function based on the difference between the expected output of the reading comprehension model and the document retrieval model.

At step 410, the machine learning framework is updated based on the weight adjusted joint learning loss. For example, framework updating module can change the weights of the reading comprehension model, document retrieval model, and encoding model to reflect the generated loss function.

Figure 5:
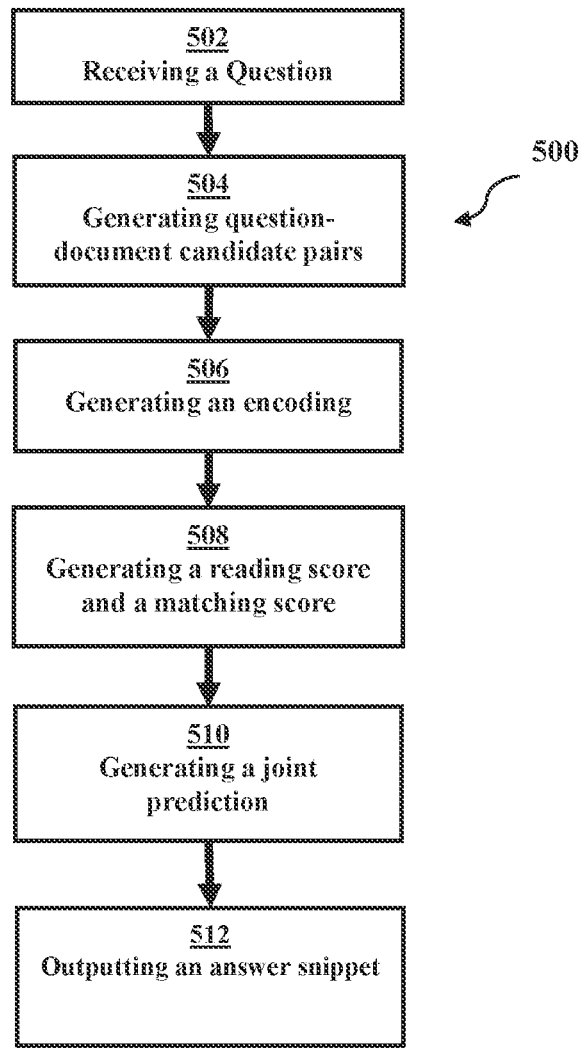
FIG. 5 is flowchart 500 for generating an answer snippet from a non-factoid question answering framework, in accordance with an embodiment of the invention.

FIG. 5 is a flowchart diagram, depicting operational steps for answering a non-factoid question across tasks and domains, generally designated 500. At step 502, the non-factoid question answering engine 104 can receive a query. In an embodiment, a question can be from a user as a typed question or an utterance.

At step 504, non-factoid question answering engine 104 can generate question/candidate document pairs. In an embodiment, non-factoid question answering engine 104 can retrieve documents from domain specific document repository 106. The retrieved documents can be paired up with the question to form question/candidate document pairs.

At step 506, encoding module 204 can encode the question/candidate document pairs. In an embodiment, the question document pairs are tokenized by tokenization module 202, producing tokens representing each word and object within the pair. An encoding, which can be a vector representation, can be generated for each token within the question/candidate document pair. In an embodiment, the generated vectors can be combined into a matrix representation of the pair.

At step 508, reading comprehension module 206 can generate a reading score for the question/candidate document pair, based on the encodings of the pair. An answer snippet can be identified while generating the reading score based on reading comprehension module 206 assigning a snippet start score and a snippet end score to each token in the document from the question/candidate document pair. Also, at step 508, document retrieval module 208 can generate a document matching score for the question candidate document pair. In an embodiment, the reading score and the matching score can be generated in parallel. In an alternative embodiment, the reading score and the matching score can be generated serially.

At step 510, joint prediction module 210 can generate a joint ranking score for the question/candidate document pair. In an embodiment, the reading score and the matching score can be combined linearly to generate a joint ranking score for the question/candidate document pair.

At step 512, joint prediction module 210 can return the identified answer snippet within the question/candidate document pair with the highest joint ranking score. In an embodiment, a plurality of question candidate documents can be jointly ranked, each with an identified answer snippet. The answer snippet from the question candidate document pair with the highest joint ranking score can be returned to the environment which the question was asked (e.g., in a graphical user interface, returned via an utterance from an agent, etc.).

FIG. 6 depicts computer system 600, in accordance with a computing device in at least one embodiment of the invention. Computer system 600 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In this embodiment, memory 16 includes random access memory (RAM) 20, cache 22 and program module 24. In general, memory 16 can include any suitable volatile or non-volatile computer readable storage media. Cache 22 is a fast memory that enhances the performance of processors 14 by holding recently accessed data, and data near recently accessed data, from memory 16.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface(s) 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
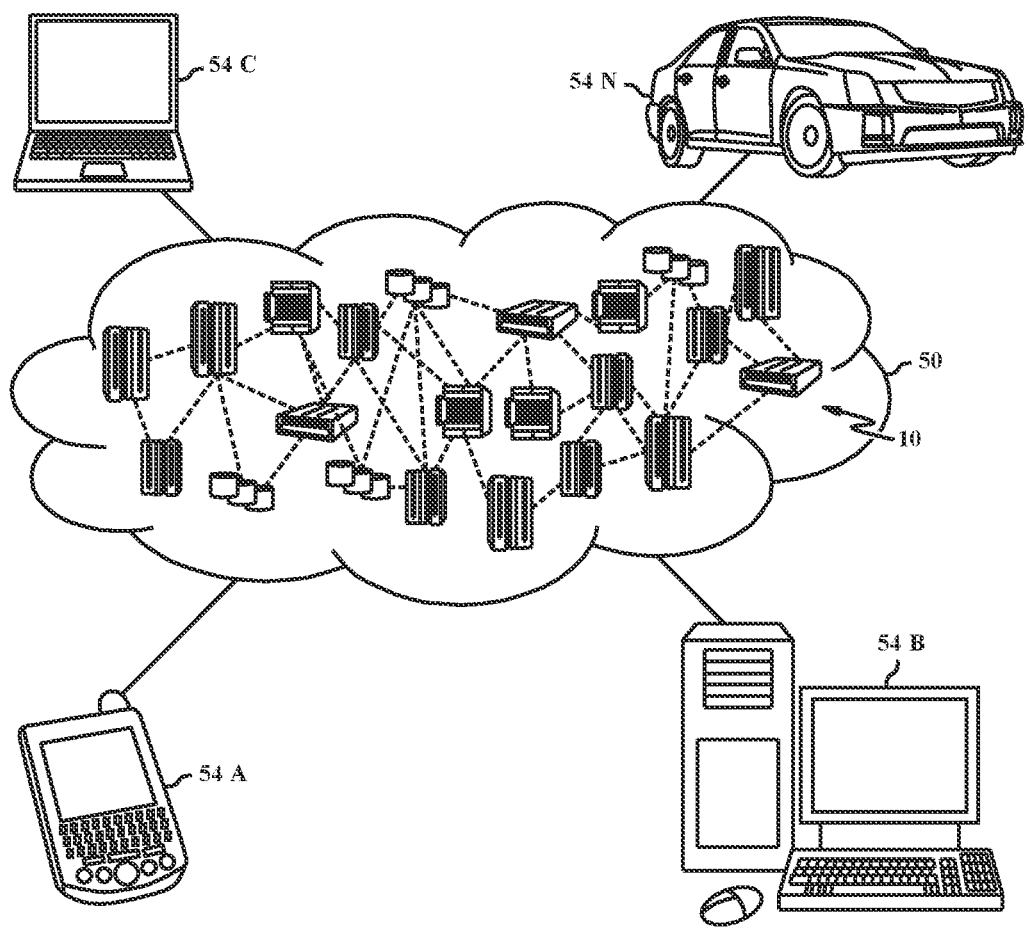
FIG. 7 is a diagram depicting a cloud computing environment, in accordance with an embodiment of the present invention.
Figure 8:
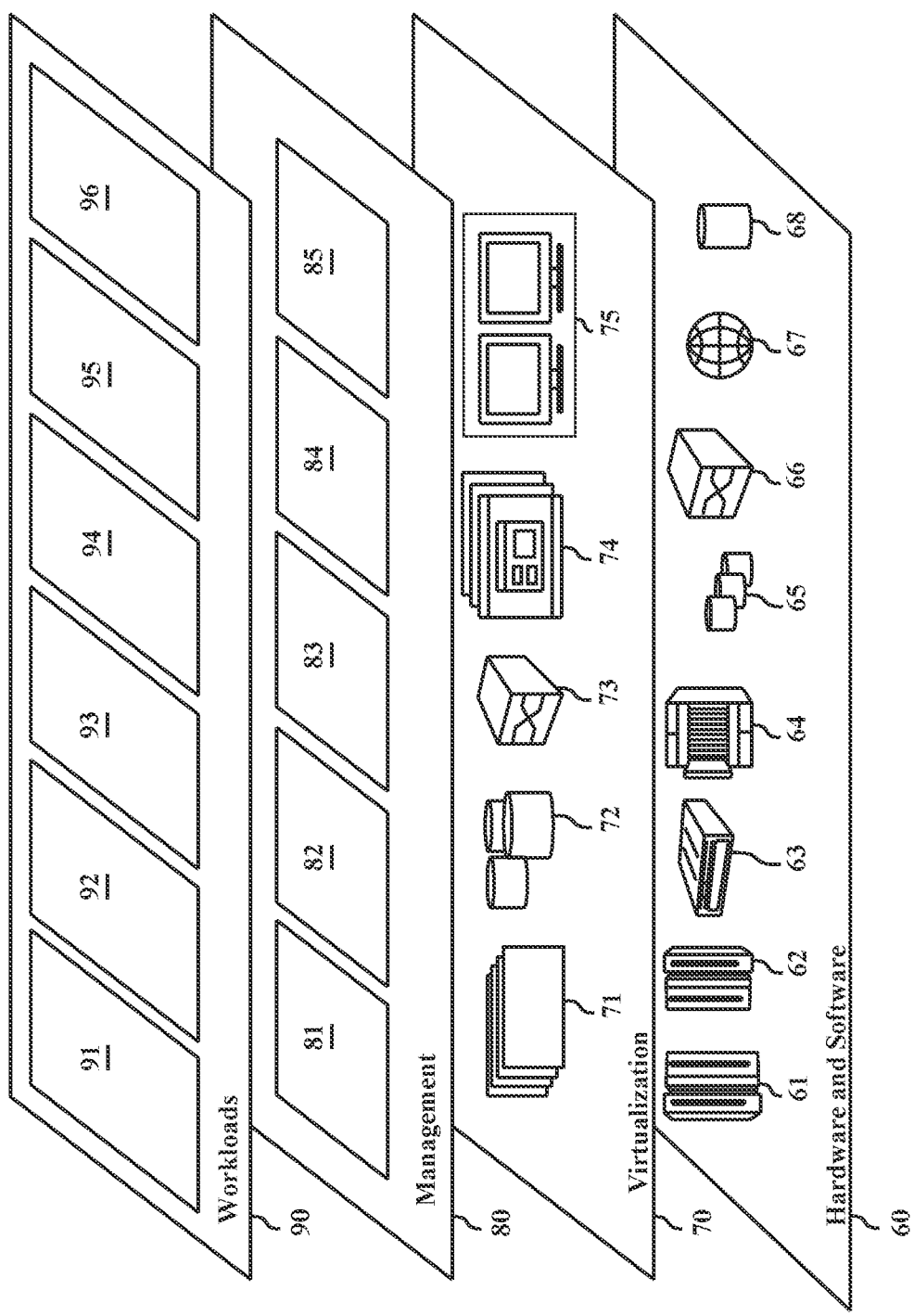
FIG. 8 is a functional block diagram depicting abstraction model layers, in accordance with an embodiment of the present invention.

FIG. 7 is a block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and non-factoid question answering 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for training a machine learning framework for answering non-factoid questions across tasks and domains, the computer-implemented method comprising:
    initializing, by the processor, a multi-task joint learning model in a specific target domain;
    receiving, by the processor, an input sequence, wherein the input sequence is a non-factoid question in the specific target domain;
    generating, by the processor, a plurality of question/candidate document pairs, wherein the question/candidate document pair is associated with a single document;
    assigning, by the processor, one or more snippet scores for each of the question/candidate document pairs, wherein a snippet score corresponds to an answer snippet;
    generating, by the processor, a reading score for each question/candidate document pair, based on the one or more assigned snippet scores;
    generating, by the processor, a matching score for the document associated with each of the question/candidate document pairs, wherein the matching score is assigned to the candidate document of the question/candidate document pair; and
    outputting, by the processor, an output sequence, based at least in part on the reading score and the matching score, wherein an output sequence is an answer snippet;
    tuning, by the processor, a multi-task joint learning model in the target domain, based on the output sequence, the reading score and the matching score.

2. The computer-implemented method of claim 1, wherein the multi-task joint learning model comprises the tasks of reading comprehension and document matching.

3. The computer-implemented method of claim 1, wherein training further comprises:
    determining, by the processor, the more difficult task between the multiple tasks of the multi-task joint learning model; and
    adjusting, by the processor, the weights of the tasks in the multi-task joint learning model, dynamically, based on the determining.

4. The computer-implemented method of claim 1, wherein the multi-task joint learning model is comprised of a language model.

5. The computer-implemented method of claim 1, wherein the multi-task joint learning model is comprised of multiple multilayer perceptron classifiers.

6. The computer-implemented method of claim 1, wherein the multi-task joint learning model is comprised of a joint prediction model, wherein during inference, the multi-task joint learning model ranks a plurality of identified answer snippets from a plurality of candidate documents.

7. The computer system of claim 1, wherein the multi-task joint learning model is comprised of a joint prediction model, wherein during inference, the multi-task joint learning model ranks a plurality of identified answer snippets from a plurality of candidate documents.

8. The computer-implemented method of claim 1, wherein generating the reading score comprises:
    tokenizing, by the processor, each of the question/candidate document pairs, a token is generated for every word in each of the question/candidate document pairs; and
    encoding, by the processor, a vector representation for each token in the question/candidate document pair.

9. A computer system for training a machine learning framework for answering non-factoid questions across tasks and domains, the system comprising:
    a processor;
    a readable storage media; and
    computer program instructions to:
        initialize a multi-task joint learning model in a specific target domain;
        receive an input sequence, wherein the input sequence is a non-factoid question in the specific target domain;
        generate a plurality of question/candidate document pairs, wherein the question/candidate document pair is associated with a single document;
        assign one or more snippet scores for each of the question/candidate document pairs, wherein a snippet score corresponds to an answer snippet;

generate a reading score for each question/candidate document pair, based on the one or more assigned snippet scores;

generate a matching score for the document associated with each of the question/candidate document pairs, wherein the matching score is assigned to the candidate document of the question/candidate document pair; and output an output sequence, based at least in part on the reading score and the matching score, wherein an output sequence is an answer snippet;

tune a multi-task joint learning model in the target domain, based on the output sequence, reading score and the matching score.

10. The computer system of claim 9, wherein the multi-task joint learning model comprises the tasks of reading comprehension and document matching.

11. The computer system of claim 9, wherein training further comprises:

determining, by the processor, the more difficult task between the multiple tasks of the multi-task joint learning model; and adjusting, by the processor, the weights of the tasks in the multi-task joint learning model, dynamically, based on the determining.

12. The computer system of claim 9, wherein the multi-task joint learning model is comprised of a language model.

13. The computer system of claim 9, wherein the multi-task joint learning model is comprised of multiple multilayer perceptron classifiers.

14. The computer system of claim 9, wherein generating the reading score comprises instructions to tokenize each of the question/candidate document pairs, a token is generated for every word in each of the question/candidate document pairs; and encode a vector representation for each token in the question/candidate document pair.

15. A computer program product for training a machine learning framework for answering non-factoid question across tasks and domains, the computer program product including one or more computer readable storage media and program instructions stored on the one or more computer readable storage media, the program instructions including instructions to:

initialize a multi-task joint learning model in a specific target domain;

receive an input sequence, wherein the input sequence is a non-factoid question in the specific target domain;

generate a plurality of question/candidate document pairs, wherein the question/candidate document pair is associated with a single document;

assign one or more snippet scores for each of the question/candidate document pairs, wherein a snippet score corresponds to an answer snippet;

generate a reading score for each question/candidate document pair, based on the one or more assigned snippet scores;

generate a matching score for the document associated with each of the question/candidate document pairs, wherein the matching score is assigned to the candidate document of the question/candidate document pair; and output an output sequence, based at least in part on the reading score and the matching score, wherein an output sequence is an answer snippet;

tune a multi-task joint learning model in the target domain, based on the output sequence, reading score and the matching score.

16. The computer program product of claim 15, wherein the general purpose machine learning framework is comprised of a language encoding model, a reading comprehension model, and a document retrieval model.

17. The computer program product of claim 15, wherein the multi-task joint learning model comprises the tasks of reading comprehension and document matching.

18. The computer program product of claim 15, wherein the multi-task joint learning model is comprised of a language model.

19. The computer program product of claim 15, wherein the multi-task joint learning model is comprised of a joint prediction model, wherein during inference, the multi-task joint learning model ranks a plurality of identified answer snippets from a plurality of candidate documents.

20. The computer program product of claim 15, wherein generating the reading score comprises instructions to:

tokenize each of the question/candidate document pairs, a token is generated for every word in each of the question/candidate document pairs; and encode a vector representation for each token in the question/candidate document pair.

* * * * *